(12) United States Patent
Oberg et al.

(10) Patent No.: US 8,072,862 B1
(45) Date of Patent: Dec. 6, 2011

(54) ADAPTIVE DISTORTION CORRECTOR

(75) Inventors: Mats Oberg, Cupertino, CA (US); Luc Segers, Peer (BE); Peter J. Kivits, Waalre (NL)

(73) Assignee: Marvell International Ltd., Hamilton (BM)

( * ) Notice: Subject to any disclaimer, the term of this patent is extended or adjusted under 35 U.S.C. 154(b) by 116 days.

(21) Appl. No.: 12/567,870

(22) Filed: Sep. 28, 2009

Related U.S. Application Data (60) Provisional application No. 61/103,013, filed on Oct. 6, 2008.

(51) Int. Cl.
*G11B 20/18* (2006.01)
(52) U.S. Cl. .................... 369/53.35; 369/59.21
(58) Field of Classification Search .............. 369/53.35, 369/59.21
See application file for complete search history.

(56) References Cited

U.S. PATENT DOCUMENTS

| | | | |
|---|---|---|---|
| 2002/0105873 A1 | 8/2002 | Watanabe et al. | |
| 2002/0159349 A1* | 10/2002 | Katayama | 369/47.18 |
| 2004/0022151 A1 | 2/2004 | Furumiya et al. | |
| 2007/0109938 A1* | 5/2007 | Shirota et al. | 369/59.11 |
| 2007/0127341 A1 | 6/2007 | Sagara et al. | |
| 2007/0165506 A1 | 7/2007 | Nakamura et al. | |
| 2007/0206475 A1 | 9/2007 | Tamaki et al. | |
| 2007/0223340 A1 | 9/2007 | Shirota et al. | |
| 2008/0094991 A1* | 4/2008 | Minemura | 369/100 |

OTHER PUBLICATIONS

Standard ECMA-267, 3rd Edition—Apr. 2001; ECMA Standardizing Information and Communication Systems; 120 mm DVD—Read-Only Disk; 91 pages.
"Modeling and Compensation of Asymmetry in Optical Recording"; Haralampos Pozidis, Member, IEEE, Jan W. M. Bergmans, Senior Member, IEEE, and Wim M.J. Coene; IEEE Transactions on Communications, vol. 50, No. 12; Dec. 2002; pp. 2052-2063.
"A Simple Nonlinear Model for the Optical Recording Channel"; Haralampos Pozidis, Wim M.J. Coene, Jan W.M. Bergmans; Philips Research Laboratories; Jan. 10, 2002; 5 pages.
"Adaptive Asymmetry Corrector"; Chris Painter; Jul. 15, 2009; 5 pages.

* cited by examiner

*Primary Examiner* — Lixi C Simpson (57) ABSTRACT

A system includes a sampling module and a correction module. The sampling module is configured to sample an input signal at sampling points and to output samples. The correction module is configured to output a correction factor when the first one of the samples is preceded by a second one of the samples having a first polarity, and when the first one of the samples is followed by a third one of the samples having a second polarity that is opposite of the first polarity. The correction factor comprises a correction value that is based on at least one of the samples that precedes the first one of the samples. The correction value is used to correct the input signal at a first one of the sampling points corresponding to the first one of the samples.

17 Claims, 9 Drawing Sheets

| Slicer Output | Correction Factor |
|---|---|
| Bit Sequence 0 | ...$C_0D_0$... |
| Bit Sequence 1 | ...$C_1D_1$... |
| Bit Sequence 2 | ...$C_2D_2$... |
| ...... | ...... |
| Bit Sequence N | ...$C_nD_n$... |

ADAPTIVE DISTORTION CORRECTOR

CROSS-REFERENCE TO RELATED APPLICATIONS

This application claims the benefit of U.S. Provisional Application No. 61/103,013, filed on Oct. 6, 2008.

This application is related to U.S. patent application Ser. No. 12/349,715, filed on Jan. 7, 2009.

The disclosures of the above applications are incorporated herein by reference in their entirety.

FIELD

The present disclosure relates to data storage systems and more particularly to correcting read errors caused by data dependent mark and pit length distortions in stored data.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Data storage systems typically comprise magnetic and optical storage devices. Magnetic storage devices include hard disk drives (HDDs). Optical storage devices include compact disc (CD) drives, digital versatile disc (DVD) drives, high definition DVD (HD-DVD) drives, Blu-ray drives, and China Blue High Definition (CBHD) drives.

In HDDs, data is written by recording magnetic flux changes having opposite polarities on a magnetic medium. The opposite polarities of the magnetic flux changes represent binary 1's and 0's (or vice versa). Data is read back from the magnetic medium by sensing the magnetic flux changes.

In optical storage devices, data is written by generating pits (marks) on an optical medium using a laser beam. Areas between the marks are called lands (spaces). Marks have different reflectivity than spaces. Accordingly, marks and spaces may represent binary 1's and 0's (or vice versa), respectively. Data is read back by sensing the marks and spaces using the laser beam.

SUMMARY

A system includes a sampling module and a correction module. The sampling module is configured to sample an input signal at sampling points and to output samples. The correction module is configured to output a correction factor when the first one of the samples is preceded by a second one of the samples having a first polarity, and when the first one of the samples is followed by a third one of the samples having a second polarity that is opposite of the first polarity. The correction factor comprises a correction value that is based on at least one of the samples that precedes the first one of the samples. The correction value is used to correct the input signal at a first one of the sampling points corresponding to the first one of the samples.

In other features, the correction factor is based on the first and second polarities.

In other features, the system further comprises a convolution module and a summing module. The convolution module is configured to convolve the correction factor with a target polynomial selected based on a sequence detector of the system and to generate a convolved output. The summing module is configured to generate an output signal by summing the convolved output and the input signal.

In other features, the sequence detector includes a Viterbi detector.

In other features, the correction module comprises a lookup module, a convolution module, and a summing module. The lookup module is configured to include a lookup table comprising a plurality of correction factors for sequences of the samples and to look up the correction factor corresponding to a sequence of the samples from the lookup table. The convolution module is configured to convolve the correction factor with a target polynomial selected based on a sequence detector of the system and to generate a convolved output. The summing module is configured to generate an output signal by summing the convolved output and the input signal.

In other features, a read channel module of one of an optical storage device and a magnetic storage device comprises.

In still other features, a method comprises receiving an input signal from a storage medium of a data storage device, sampling the input signal at sampling points, and outputting samples. The method further comprises outputting a correction factor comprising a correction value. The method further comprises correcting the input signal at a first one of the sampling points corresponding to a first one of the samples using the correction value when the first one of the samples is preceded by a second one of the samples having a first polarity, and when the first one of the samples is followed by a third one of the samples having a second polarity that is opposite of the first polarity. The correction value is based on at least one of the samples that precedes the first one of the samples.

In other features, the correction factor is based on the first and second polarities.

In other features, the method further comprises convolving the correction factor with a target polynomial selected based on a sequence detector of the data storage device and generating a convolved output. The method further comprises generating an output signal by summing the convolved output and the input signal.

In other features, the method further comprises outputting the correction factor corresponding to a sequence of the samples from a lookup table comprising a plurality of correction factors for sequences of the samples. The method further comprises convolving the correction factor with a target polynomial selected based on a sequence detector of the data storage device and generating a convolved output. The method further comprises generating an output signal by summing the convolved output and the input signal.

In still other features, the systems and methods described above are implemented by a computer program executed by one or more processors. The computer program can reside on a computer readable medium such as but not limited to memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

In optical storage devices, data is stored on the optical medium in the form of pits (marks) and lands (spaces). The lengths of the pits and lands are typically integer multiples of a length of a bit stored. The pits and lands correspond to contiguous strings of 0's and 1's of a data sequence stored. The stored data sequence is read back by scanning the pits and lands using a spot of laser beam. A read signal called a replay signal is generated based on light reflected from the pits and lands.

Depending on the data written, some pits and lands may be of the same size. Occasionally, however, the pits and lands that should be of the same size may differ in size. The sizes of the pits and lands may differ due to several reasons.

For example, the focus and/or power of the laser beam may vary when writing data. Variations in focus and/or power of the laser beam may cause over-etching and/or under-etching of the pits. The over-etching and/or under-etching may in turn cause the pits and lands to differ in size when they should be equal in size. Another example may include sub-optimal write strategy timing settings. The sub-optimal settings can cause lands and/or marks as part of one or more data patterns to be longer or shorter than their nominal lengths. Consequently, transitions from marks to spaces and/or vice versa may not occur at the expected locations.

The differences in the size of marks and spaces compared to their nominal sizes cause at least some transitions to occur either too early or too late. These non-nominal lengths of marks and spaces can increase probability of error upon readback of the replay signal. The non-nominal lengths of marks and spaces also increase data-to-clock jitter and/or data-to-data jitter.

The non-nominal lengths of marks and spaces may also be called length distortions. The length distortions may be positive and/or negative. Positive length distortions may result from pits that are longer than lands due to over-etching instead of being of the same size as the lands in a sample data pattern. Conversely, negative length distortions may result from pits that are shorter than lands due to under-etching instead of being of the same size as the lands in the sample data pattern.

The length distortions may shift leading and trailing edges of the pits. For example, in case of positive length distortions, the leading and trailing edges of the pits may shift away from the center of the pits. Conversely, in case of negative length distortions, the leading and trailing edges of the pits may shift towards the center of the pits.

Consequently, the replay signal may be distorted. For example, due to a space being too long, the falling edge of the replay signal (a transition from land to pit) may fall later than normal since the land ends later than normal. Similarly, due to a space being too short, the falling edge of the replay signal may fall too early. Accordingly, when the replay signal is output to a detector to recover data during read operations, the length distortions of the marks and spaces may cause read errors.

Figure 1A:
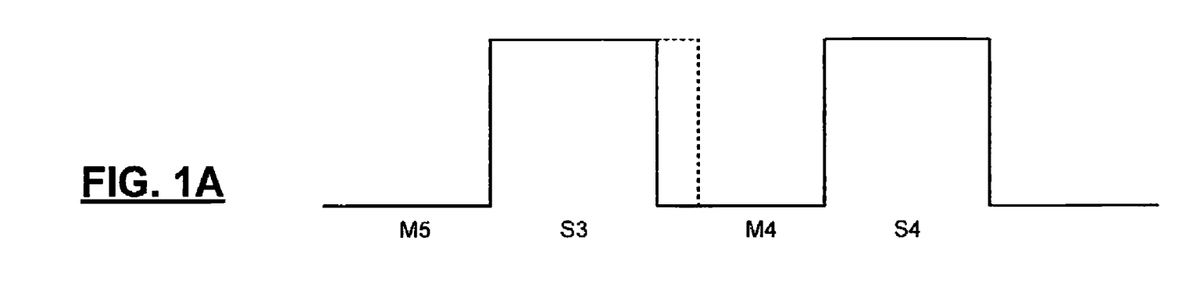
FIGS. 1A and 1B depict examples of data-dependent differences in lengths of marks and spaces based on data stored in an optical medium.
Figure 1B:
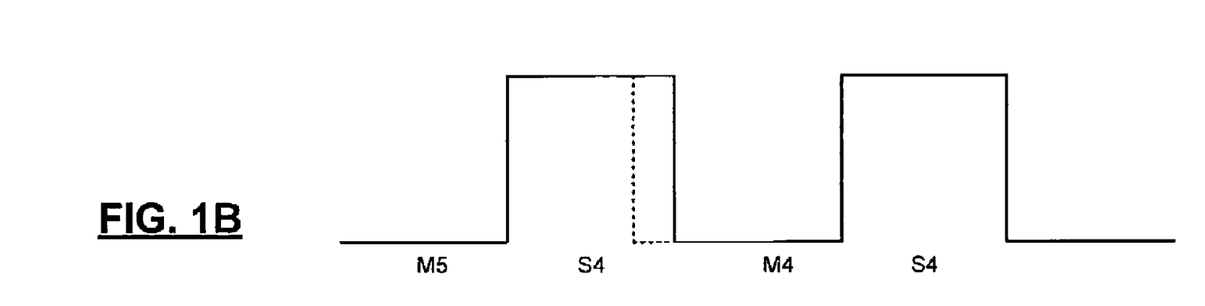

Referring now to FIGS. 1A and 1B, the length distortions may be data dependent. That is, the length distortions may depend on a sequence of bits preceding a transition and a sequence of bits following the transition. The data dependent differences in lengths of marks and spaces may be caused by sub-optimal write strategy timing. In FIGS. 1A and 1B, examples of two different bit sequences are shown.

In FIG. 1A, the read signal may include an M5S3M4S4 bit sequence. Mx indicates a mark having x bits each of period T. Sy indicates a space having y bits each of period T. As shown by a dotted line, the S3M4 transition may occur later than normal when S3 is preceded by M5 and M4 is followed by S4. Thus, the length of the space S3 is increased, and the length of the mark M4 is decreased when S3 is preceded by M5 and M4 is followed by S4. A different result may obtain if, for example, S3 is preceded by M3 and M4 is followed by S3.

Conversely, in FIG. 1B, when the bit sequence is M5S4M4S4 instead of M5S3M4S4, the S4M4 transition may occur earlier than normal as shown by the dotted line. The S4M4 transition may occur earlier than normal when S4 is preceded by M5 and M4 is followed by S4. Thus, the length of the space S4 is decreased, and the length of the mark M4 is increased when S4 is preceded by M5 and M4 is followed by S4. A different result may obtain if, for example, S4 is preceded by M3 and M4 is followed by S3.

Thus, the length distortion may be data dependent and may be different for different transitions depending on data preceding and following the transitions. Accordingly, the position of a transition may depend on lengths of more than one mark/space that precedes/follows the transition.

Figure 2A:
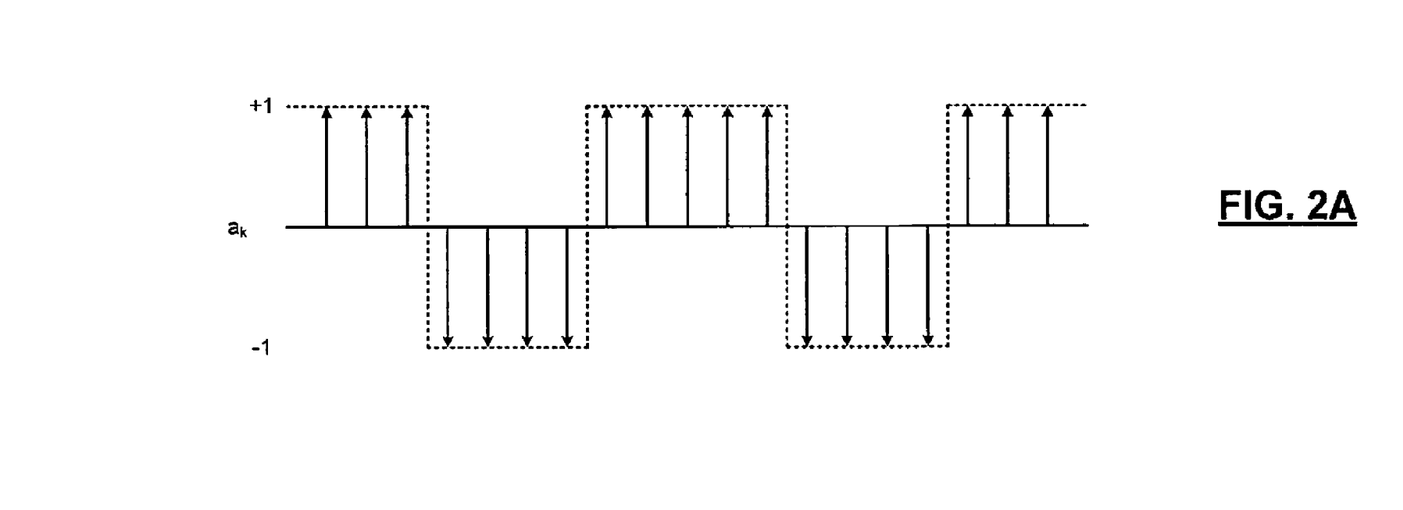
FIG. 2A depicts an exemplary encoded data sequence written on an optical medium.
Figure 2B:
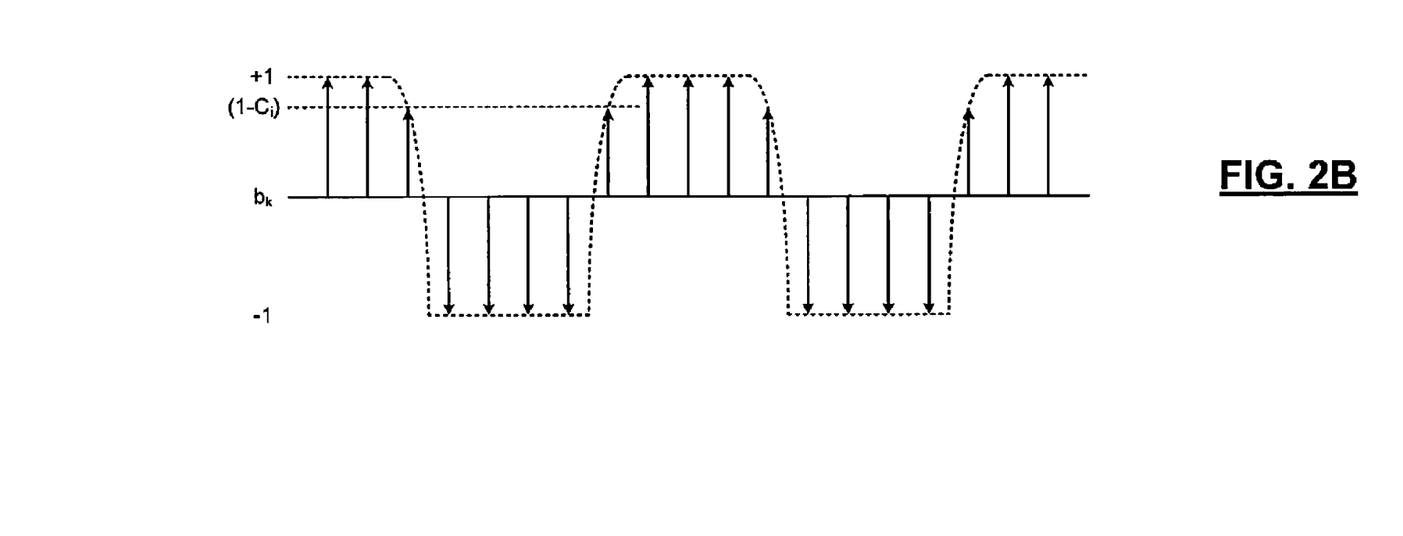
FIG. 2B depicts distortion caused by non-nominal lengths of marks and spaces when the data sequence of FIG. 3A is written.

Referring now to FIGS. 2A and 2B, the distortion and read errors caused by non-nominal lengths of marks and spaces may be reduced using a correction factor. Specifically, transitions from pits to lands and from lands to pits may be adjusted using the correction factor during read operations. For example, a transition edge marked "," in a sequence −1−1−1+1+1+1, −1−1−1−1+1+1 or in a sequence +1+1+1+1+1+1, −1−1−1+1+1+1 may be moved either to the left or to the right using the correction factor. The correction factor may be generated by modeling the effect of distorted lengths of marks and spaces.

In FIG. 2A, $a_k$ denotes an encoded bit sequence, where $a_k$=[−1, +1]. For example only, $a_k$=−1 for pits, and $a_k$=+1 for lands. A transition occurs when level of the bit sequence changes from −1 to +1 (i.e., from pit (mark) to land (space)) or from +1 to −1 (i.e., from land (space) to pit (mark)). The transition from −1 to +1 is called a rising edge. The transition from +1 to −1 is called a falling edge.

In some implementations, read amplifiers may invert read signals. When read amplifiers invert read signals, transitions from −1 to +1 may be called falling edges, and transitions from +1 to −1 may be called rising edges. The present disclosure refers to read signals that are not inverted. The teachings of the present disclosure, however, apply equally when read signals are inverted.

In FIG. 2B, for example only, effects of all lands being too long are shown. Symbols $b_k$ denote stored symbols with positive length distortion. Due to positive length distortion, a transition from a land to a pit (i.e., a falling edge) occurs earlier than normal. Additionally, a transition from a pit to a land (i.e., a rising edge) occurs later than normal. Consequently, a value of a bit immediately adjacent to a transition may be different than +1 or −1.

The effects of all lands being too long may be modeled as follows. Amplitudes of first and last bits with positive polarity (land) may be reduced from +1 by a positive amount $C_i$ to $(1-C_i)$ while the bits of the pits remain unchanged. $C_i$ is a measure of the length distortion for a bit sequence (i.e., data pattern) i. Effectively, the length of the pits is increased while the length of the lands is decreased, thereby causing positive length distortion. Accordingly, the falling edges of the replay signal may fall earlier than normal while the rising edges may rise later than normal.

Thus, positive length distortion may be modeled by changing amplitudes of bits $a_k$ of positive polarity that are immediately adjacent to a transition. Conversely, the negative length distortion may be modeled by changing amplitudes of bits $a_k$ of negative polarity that are immediately adjacent to a transition.

Due to length distortions, the symbols $b_k$ may be ternary and may have values of +1, $B_i$, or −1. $B_i$ is a function of $C_i$. For example, $B_i=(1-C_i)$ when $C_i>0$ (positive length distortion). Alternatively, $B_i=(-1-C_i)$ when $C_i<0$ (negative length distortion). The value of $C_i$ may be proportional to the amount of length distortion present in the replay signal. Accordingly, the distortion in the replay signal may be reduced by adjusting positions of transitions using a correction factor generated based on the value of $C_i$.

Mathematically, the replay signal ($r_k$) may be represented by the following equation:

$$r_k = (b*f)_k + n_k$$

where * denotes a convolution operation, $f_k$ denotes an impulse response of an optical channel used to read data, and $n_k$ denotes noise. Further, $b_k=(a_k-c_k)$, where $c_k$ is a correction factor generated based on the value of $C_i$. For example only, $c_k$ may be expressed by the following equation:

$$C_k = \tfrac{1}{4}(|Ci|+Ci*a_k)(2a_k - a_{k+1} - a_{k-1})$$

Figure 3:
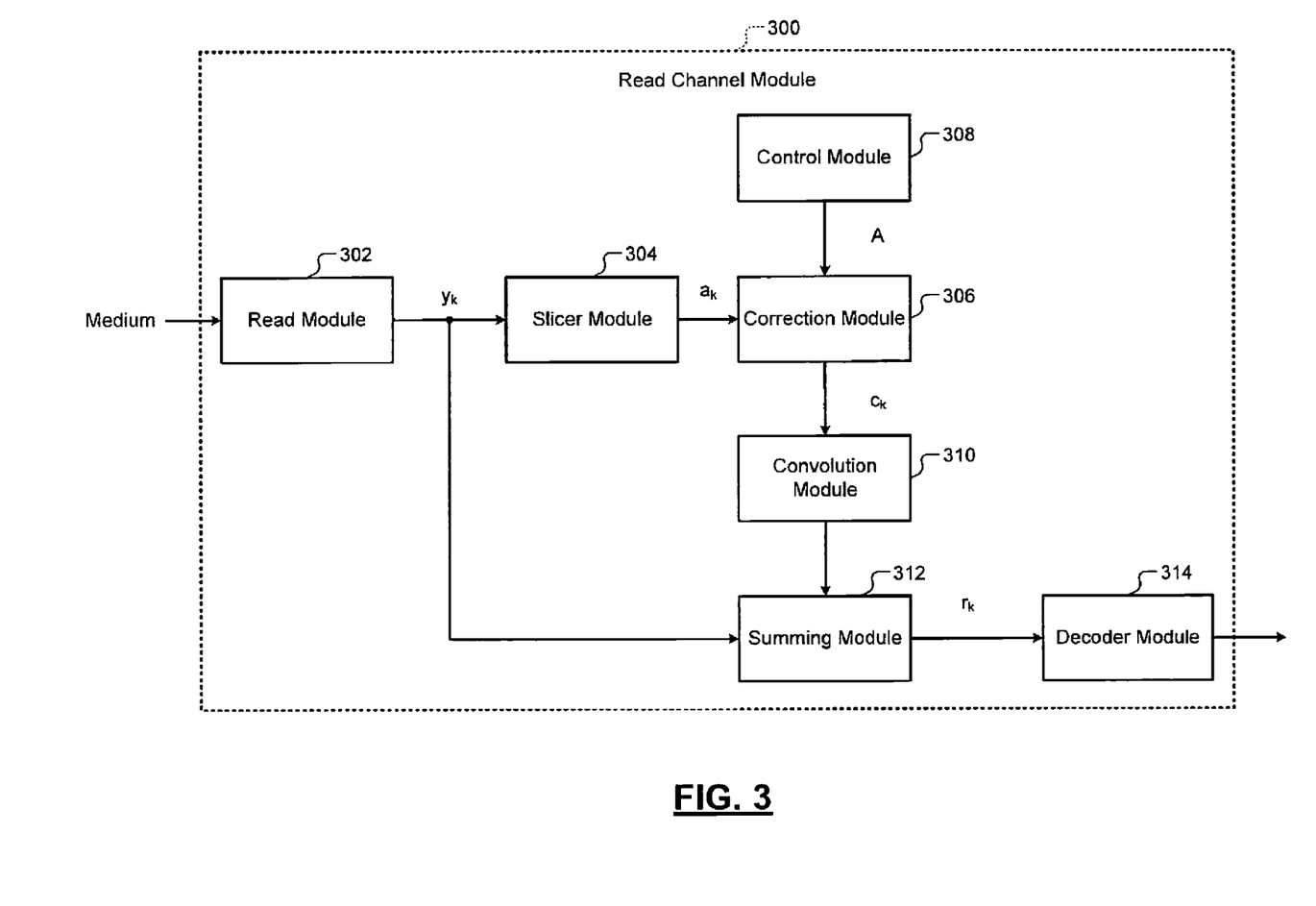
FIG. 3 is a functional block diagram of a read channel module comprising a system for reducing errors due to data dependent length distortions of marks and spaces.

Referring now to FIG. 3, a first system for reducing distortion in the replay signal is shown. The first system may be implemented in a read channel module 300 of a storage device. The storage device may include the optical storage device or the magnetic storage device. The read channel module 300 may comprise a read module 302, a slicer module 304, a correction module 306, a control module 308, a convolution module 310, a summing module 312, and a decoder module 314.

The read module 302 reads data stored on a storage medium via a channel of the storage device. The storage medium may include the optical storage medium or the magnetic storage medium. The channel may include an optical read/write channel or a magnetic read/write channel.

The optical channel may comprise an apparatus that receives light reflected from the lands and pits, processes the reflected light, and generates the replay signal. The magnetic channel may include an apparatus that senses magnetic flux changes recorded on the magnetic storage medium, processes the magnetic flux changes, and generates the replay signal.

The channel may have an impulse response $f_k$. The read module 302 outputs a signal $y_k$ to the slicer module 304. The signal $y_k$ may be an output of a finite impulse response (FIR). The signal $y_k$ may be called the read signal or the replay signal.

Ideally, $y_k=a_k*$(target polynomial), where the target polynomial is based on a design parameter of the storage device. For example, the target polynomial may be selected based on a design of a sequence detector used by the decoder module 314 to decode data. Specifically, the target polynomial is used to control the finite impulse response of the channel. Typically, an equalizer (not shown) is used to equalize the finite impulse response to a controlled target response suitable for the sequence detector.

Generally, an order N of the target polynomial is based on $2^N$ states of the sequence detector (e.g., a Viterbi detector), where N is an integer greater than 0. For example, the target polynomial may be of the third-order when the decoder has $2^3=8$ states. For example only, a third-order target polynomial may include a polynomial $(1+2D+2D^2+D^3)$. The states, however, may be less than $2^N$ due to run length constraints in modulation code used.

Practically, however, $y_k$ may not be $y_k=a_k*$(target polynomial) due to the length distortion. Instead, $y_k$ may be $y_k=b_k*$(target polynomial). Decoding $y_k=b_k*$(target polynomial), however, may cause errors in decoded data. Accordingly, decoding $y_k=a_k*$(target polynomial) is preferred to correctly decode the data.

The read channel module 300 generates $y_k=a_k*$(target polynomial) from decoding $y_k=b_k*$(target polynomial). Specifically, the read channel module 300 adjusts $b_k$ to approximately match $a_k$. The read channel module 300 adjusts $b_k$ by adjusting transitions of the signal $y_k$ using the correction factor as follows.

The slicer module 304 slices the read signal at sampling points and generates sequences of 1's and 0's from samples in the read signal. The slicer module 304 outputs signal levels that may be denoted by +1 and −1. For example, the output of the slicer module 304 may be denoted by $a_k$=[−1, +1]. Thus, the slicer module 304 outputs sample values +1 and −1. A sequence of these +1's and −1's may be called a bit sequence and may be denoted by $a_k$.

The correction module 306 receives $a_k$ from the slicer module 304. Additionally, the correction module 306 receives a predetermined value of $C_i$ from the control module 308. The control module 308 generates the predetermined value of $C_i$ by modeling the length distortion.

The correction module 306 generates a correction factor $c_k$ based on $a_k$ and $C_i$, where $b_k=(a_k,c_k)$. The convolution module 310 convolves $c_k$ and the target polynomial and generates ($c_k$*target polynomial). The summing module 312 sums $y_k=b_k$*(target polynomial) and ($c_k$*target polynomial) and generates $y_k=a_k$*(target polynomial). Specifically, the summing module subtracts ($c_k$*target polynomial) generated by the convolution module 310 from $y_k=b_k$*(target polynomial).

Mathematically, $b_k=(a_k+c_k)$. Therefore, $y_k=b_k$*(target polynomial) gives $y_k=(a_k+c_k)$*(target polynomial)= ($a_k$*target polynomial)+($c_k$*target polynomial). The summing module 312 subtracts ($c_k$*target polynomial) from the sum $y_k=(a_k$*target polynomial)+($c_k$*target polynomial) to give $y_k=a_k$*(target polynomial). Effectively, the transitions of the signal $y_k$ are adjusted by the correction factor $c_k$.

The summing module 312 outputs $y_k=a_k$*(target polynomial) to the decoder module 314. The decoder module 314 correctly decodes data from $y_k=a_k$*(target polynomial). The decoder module 314 may comprise a sequence detector (e.g., a Viterbi detector). The order of target polynomial may be based on the number of states of the sequence detector.

In use, for example, the slicer module 304 may output a bit sequence +1+1+1−1−1−1. A length of the bit sequence processed by the correction module 306 may be selected based on the target polynomial. The bit sequence +1+1+1−1−1−1 includes a space-to-mark (land-to-pit) transition from +1 to −1. In other words, the bit sequence +1+1+1−1−1−1 includes a falling edge. Depending on the value of $C_i$ ($C_i>0$ or $C_i<0$), one of two approaches may be used to adjust or shift the position of the transition to compensate for length distortion. Depending on the value of $C_i$, the input signal may be adjusted at a sample point corresponding to a sample immediately preceding or following the transition.

For example, when $C_i>0$, the input signal may be adjusted at a sample point corresponding to a sample immediately preceding the transition. For example, the output of the slicer module 304 may be +1+1+1−1−1−1. The input signal may be adjusted at a sample point corresponding to the sample +1 that precedes the sample −1 (e.g., +1+1(+1−$C_i$)−1−1−1).

Conversely, when $C_i<0$, the input signal may be adjusted at a sample point corresponding to a sample immediately following the transition. For example, the output of the slicer module 304 may be +1+1+1−1−1−1. The input signal may be adjusted at a sample point corresponding to the sample −1 that follows the sample +1 (e.g., +1+1+1(−1+$C_i$)−1−1).

In some implementations, the input signal may be adjusted at a sample point that lies only one side of the transition regardless of whether $C_i>0$ or $C_i<0$. For example, the input signal may be adjusted at a sample point preceding the transition regardless of whether $C_i>0$ or $C_i<0$. Alternatively, the input signal may be adjusted at a sample point following the transition regardless of whether $C_i>0$ or $C_i<0$.

Further, the sample point may not be immediately adjacent to the transition. Instead, sample points other than those immediately adjacent to the transition may be selected for adjustment by adding delays.

In addition to values of $C_i$, bit sequences i output by the slicer module 304 and types of transitions present in the bit sequences i may determine whether to adjust the input signal at a sample point preceding or following the transition. For example, when $C_i>0$ and when the bit sequence is +1+1+1−1−1−1 that includes a falling edge (an S3M3 edge), the input signal may be adjusted at a sample point immediately preceding the transition. Thus, when the output of the slicer module 304 is +1+1+1−1−1−1, the input signal may be adjusted at a sample point corresponding to the sample +1 that precedes the sample −1 (e.g., +1+1(+1−$C_i$)−1−1−1).

Conversely, when $C_i>0$ (same as above) and when the bit sequence is −1−1−1+1+1+1 (inverse of above) that includes a rising edge (an M3S3 edge), the input signal may be adjusted at a sample point immediately following the transition. Thus, when the output of the slicer module 304 is −1−1−1+1+1+1, the input signal may be adjusted at a sample point corresponding to the sample +1 that follows the sample −1 (e.g., −1−1−1(+1−$C_i$)+1+1).

The length distortions, however, are data-dependent and may not be uniform. Accordingly, the transitions in the replay signal may not shift by the same amount. Instead, the transitions in the replay signal may shift by varying amounts depending on the data read. Therefore, using a single correction factor for every transition regardless of the data read may not correct some read errors.

Accordingly, the present disclosure relates to using multiple correction factors depending on the data read. The correction factors may differ based on bit sequences generated by the slicer module 304 and types of transitions in the bit sequences. For example, a correction factor may depend on bits that precede and/or follow a transition in a bit sequence. Further, the correction factor may depend on whether the transition is a falling edge or a rising edge. Additionally, the correction factor may be different when the length distortions are positive than when the length distortions are negative.

The correction factors may be determined experimentally and stored in a lookup table. When a bit sequence is received, a correction factor corresponding to the bit sequence may be selected from the lookup table. The correction factor may then be used to correct the length distortion in the input signal.

Figure 4A:
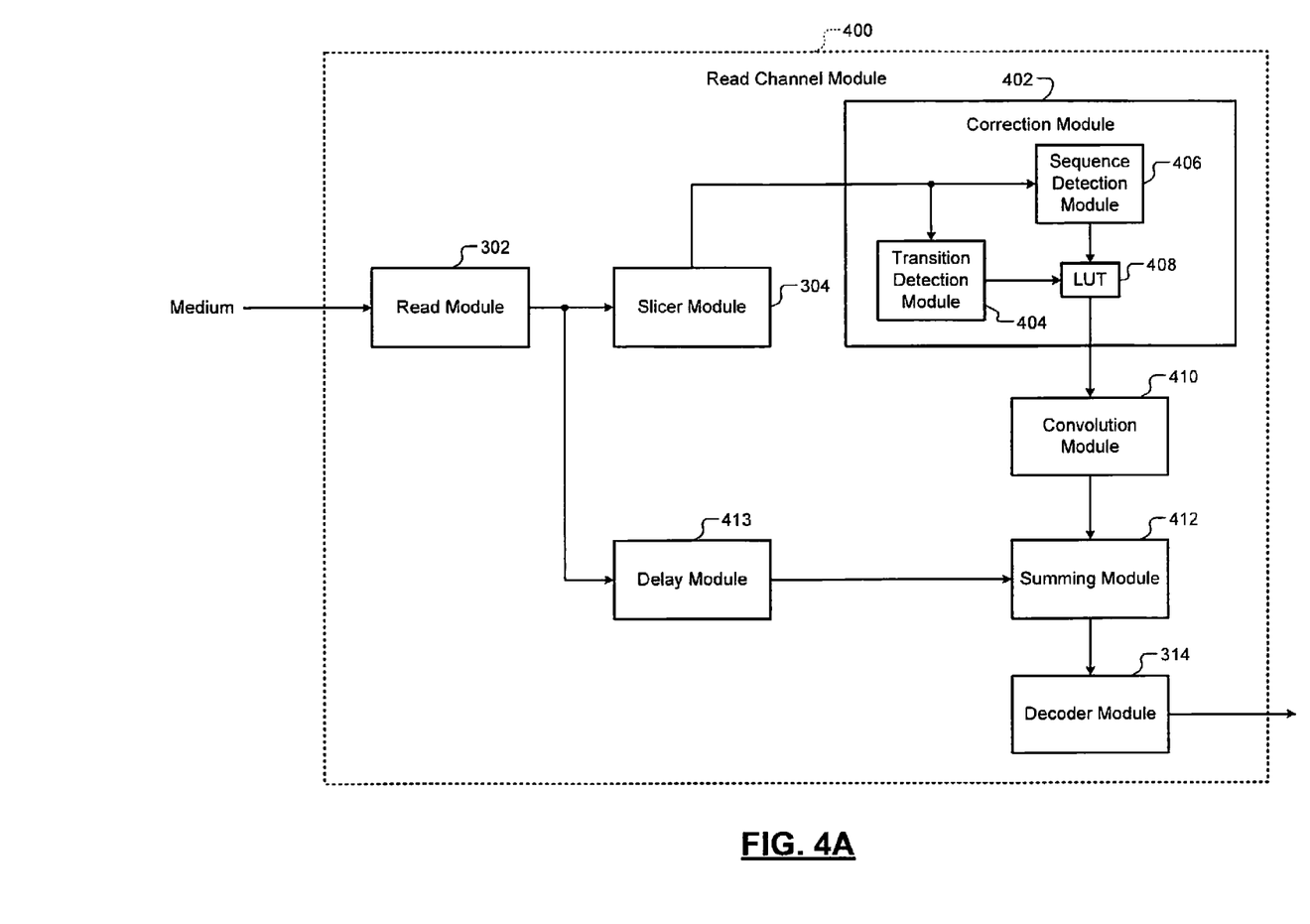
FIG. 4A is a functional block diagram of a read channel module comprising a system for reducing errors due to data dependent length distortions of marks and spaces using correction factors.
Figure 4B:
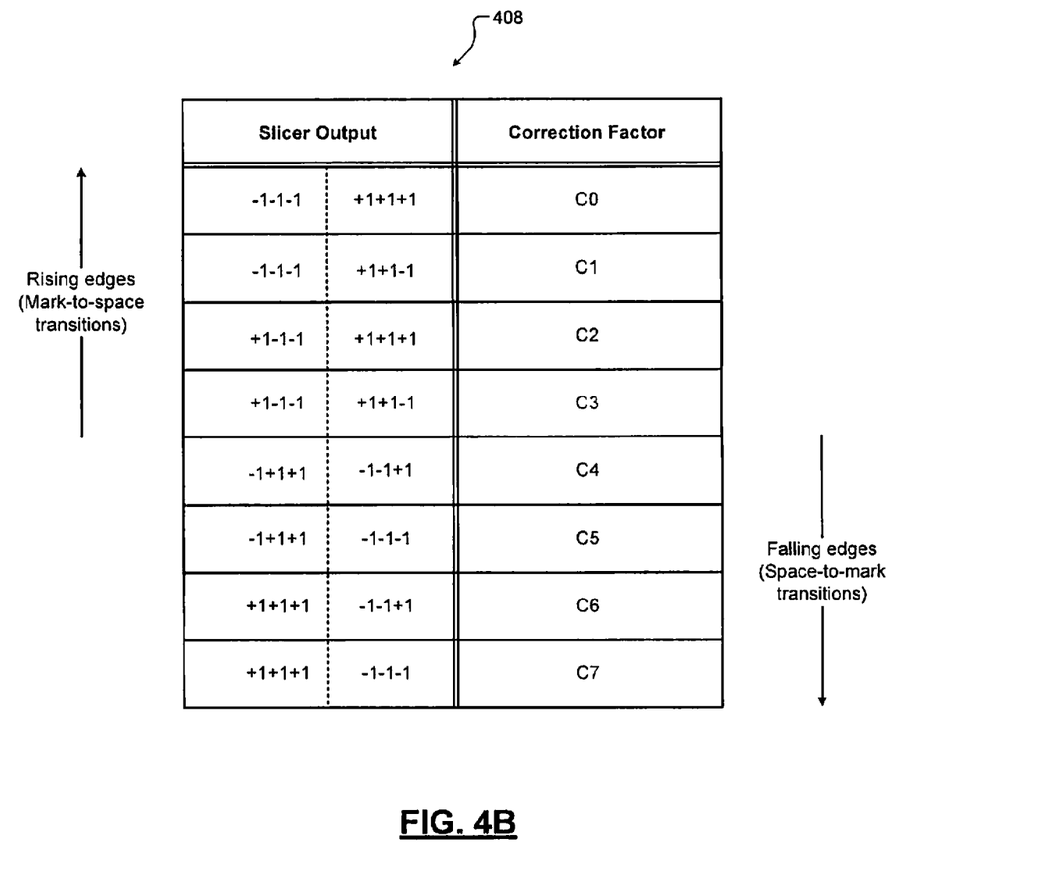
FIG. 4B shows an example of a lookup table that may be used in the system of FIG. 4A.
Figure 4C:
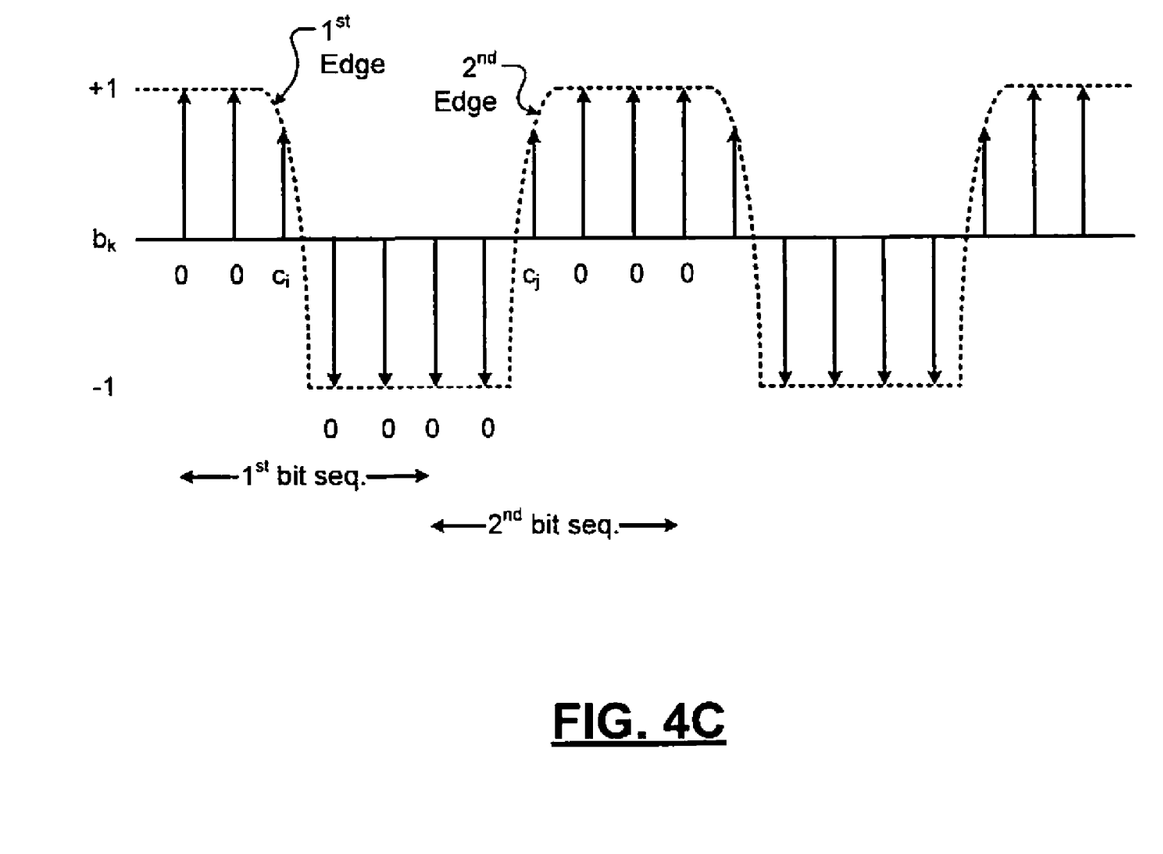
FIG. 4C depicts errors caused by data dependent length distortions of marks and spaces and examples of correction factors used to reduce the errors.

Referring now to FIGS. 4A-4C, a second system for reducing distortion in the replay signal is shown. In FIG. 4A, the second system may be implemented in a read channel module 400. The read channel module 400 may comprise the read module 302, the slicer module 304, a correction module 402, a convolution module 410, a summing module 412, a delay module 413, and the decoder module 314.

The correction module 402 may comprise a transition detection module 404, a sequence detection module 406, and a lookup table 408. The transition detection module 404 may detect a transition and a type of transition based on the output of the slicer module 304. For example, the transition detection module 404 may detect a falling edge (i.e., a space (land) to mark (pit) transition) when the slicer output changes from +1 to −1. Additionally, transition detection module 404 may detect a rising edge (i.e., a mark (pit) to space (land) transition) when the slicer output changes from −1 to +1.

The transition detection module 404 may output a control signal to the lookup table 408 when a transition is detected. The control signal may also indicate the type of transition (i.e., whether the transition is a falling edge or a rising edge).

The sequence detection module 406 may detect a bit sequence based on the output of the slicer module 304. The sequence detection module 406 may detect the bit sequence using a bit clock of period T, where the period T corresponds to a length (duration) of each bit. Thus, for example, a falling edge may be an S3M3 edge when the duration of space preceding the falling edge is 3T and the duration of mark following the falling edge is 3T. Conversely, a rising edge may be an M3S2 edge when the duration of mark preceding the rising edge is 3T and the duration of space following the rising edge is 2T.

The sequence detection module 406 may output the detected sequence to the lookup table 408. A combination of the control signal and the bit sequence detected may be used to select appropriate correction factor from the lookup table 408. In some implementations, the bit sequence detected may be used to select appropriate correction factor from the lookup table 408. Thus, the sequence detection module 406 selects an index in the lookup table 408.

In FIG. 4B, the lookup table 408 comprises multiple entries. Each entry includes a bit sequence that may be output by the slicer module 304 and a corresponding correction factor for the bit sequence. Each bit sequence in the lookup table 408 may include one or more transitions. Each transition in the bit sequence may be preceded and/or followed by one or more bits of the bit sequence. A vertical dotted line shows where transitions occur in some exemplary bit sequences of the lookup table 408.

Each entry in the lookup table 408 may be distinct from another. The correction factor for each bit sequence may be different. Further, each correction factor may be a function of the length distortion. That is, each correction factor may be a function of $C_i$, where $C_i$ is a measure of the length distortion in the replay signal for a bit sequence i. Further, each correction factor may be denoted by a polynomial. The polynomial may be based on the target polynomial.

Generally, the lookup table 408 may comprise entries for every possible bit sequence. Such a lookup table, however, would use large amounts of memory. Instead, the number of entries in the lookup table 408 may be limited to bit sequences comprising at least two consecutive +1's. Thus, for example only, the lookup table 408 may comprise entries that include correction factors for S3M3, S3M2, and S2M2 falling edges and M2S2, M2S3, and M3S3 rising edges. The entries may include additional or fewer bit sequences, transitions, and corresponding correction factors. In some implementations, the lookup table 408 may include only those entries that provide correction greater than or equal to a predetermined threshold. Further, the lookup table 408 may include only those entries that provide significant corrective contributions.

The correction factors may include correction values for correcting transitions. The number of bits and transitions in the bit sequence may determine the number of values in the correction factor. Thus, if the bit sequence being corrected includes B bits, the correction factor corresponding to the bit sequence may include B correction values. At least one of the correction values may be non-zero and may correct at least one transition in the bit sequence. Other correction values in the correction factors may be zero.

In FIG. 4B, for example and simplicity, only eight entries of the lookup table 408 are shown. Top four entries include four bit sequences with rising edges. Bottom four entries include four bit sequences with falling edges. Further, for example and simplicity, the length of the bit sequences is limited to six bits. Bit sequences of other lengths may be used.

For example only, the bit sequences with the falling edges (from fifth to last entry) are inverses (i.e., compliments) of the bit sequences with the rising edges (from fourth to first entry). For example, the fifth bit sequence −1+1+1−1−1+1 is an inverse of the fourth bit sequence +1−1−1+1+1−1, etc. +1's and −1' may be synonymous with binary 1's and 0's.

In use, for example, the sequence detection module 406 may use the bit clock to detect a bit sequence (e.g., −1−1−1+1+1+1) from the output of the slicer module 304. The transition detection module 404 may detect a rising edge (i.e., a transition from a mark (−1) to a space (+1)) in the bit sequence. A combination of the control signal, the value of $C_i$, and the bit sequence detected is used to select appropriate correction factor from the lookup table 508. In some implementations, the value of $C_i$ and the bit sequence detected is used to select appropriate correction factor from the lookup table 508.

The lookup table 408 may output a correction factor C0 corresponding to the rising edge and the bit sequence −1−1−1+1+1+1. The correction factor C0 may include correction values 000$C_0$00. The correction value $C_0$ is used to correct the transition from −1 to +1 in the bit sequence. The correction values for other bits that are not adjacent to the transition in the bit sequence are zeros. Accordingly, at sample points corresponding to the other bits in the bit sequence, the input signal is left unchanged by the zeros in the correction factor.

Thus, the lookup table 408 may output a correction factor $C_i$ corresponding to the bit sequence i. The correction factor $C_i$ may depend on the bit sequence and may include a correction value depending on the type of transition present in the bit sequence i. The correction value may correct the input signal at a sample point corresponding to the bit immediately following the transition in the bit sequence i. Alternatively, the correction value may correct the input signal at a sample point corresponding to the bit immediately preceding the transition in the bit sequence i. The correction factor $C_i$ may include zeros for sample points corresponding to other bits in the bit sequence i.

In FIG. 4C, another example of bit sequences and corresponding correction factors is shown. A first bit sequence (e.g., bit sequence i) +1+1+1−1−1−1 may include a first edge (transition). The correction factor for the first bit sequence may be 00$C_i$000. A second bit sequence (e.g., bit sequence j) −1−1+1+1+1+1 may include a second edge. The correction factor for the second bit sequence may be 00$C_j$000, etc.

Occasionally, some bit sequences may include no transitions while some bit sequences may include a plurality of transitions depending on the data read. Additionally, some bits of adjacent bit sequences may overlap. The size of the lookup table 408 may depend on the size of bit sequences selected for correction.

The convolution module 410 convolves the target polynomial and the correction factor output by the lookup table 408. The summing module 412 sums the signal $y_k$ and the output of the convolution module 410. Effectively, the input signal is corrected at a sample point corresponding to the position of the transition (i.e., the edge position) based on the correction factor for the transition.

The delay module 413 delays the signal $y_k$ to synchronize timings of the signal $y_k$ and the output of the convolution module 410. Accordingly, the summing module 412 adds the signal $y_k$ to the output of the convolution module 410 that are synchronized in time. The decoder module 314 correctly decodes data from the signal $y_k$.

Figure 5A:
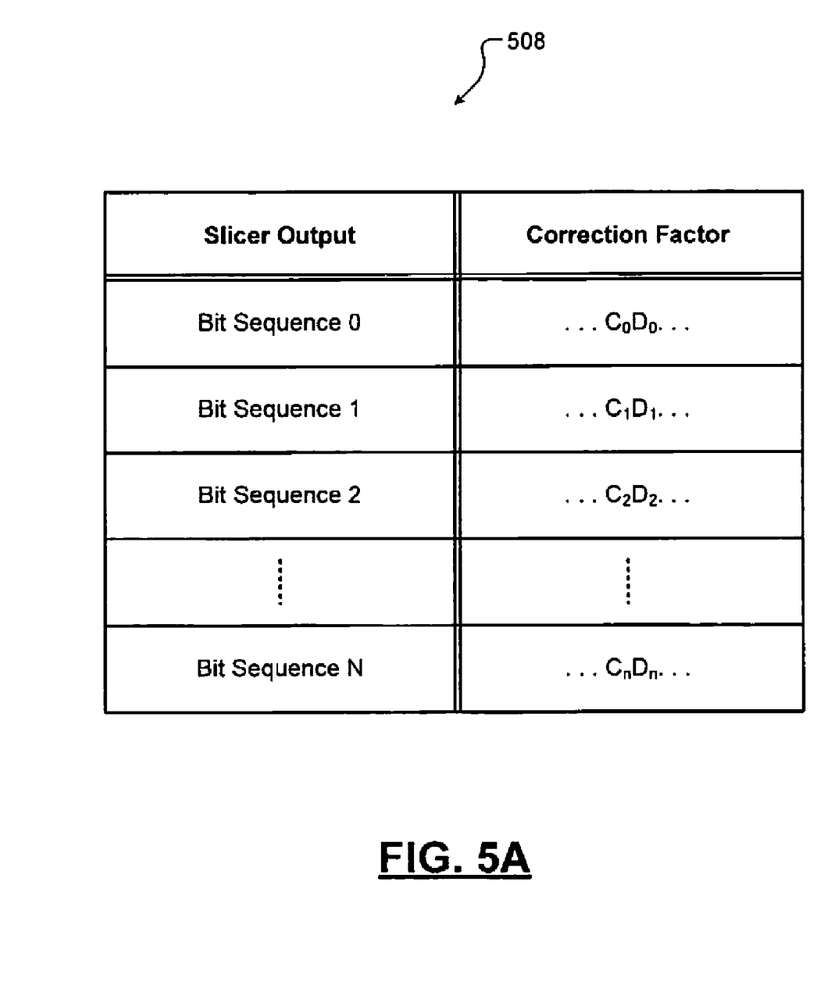
FIG. 5A shows an example of a lookup table that may be used in the system of FIG. 4A.
Figure 5B:
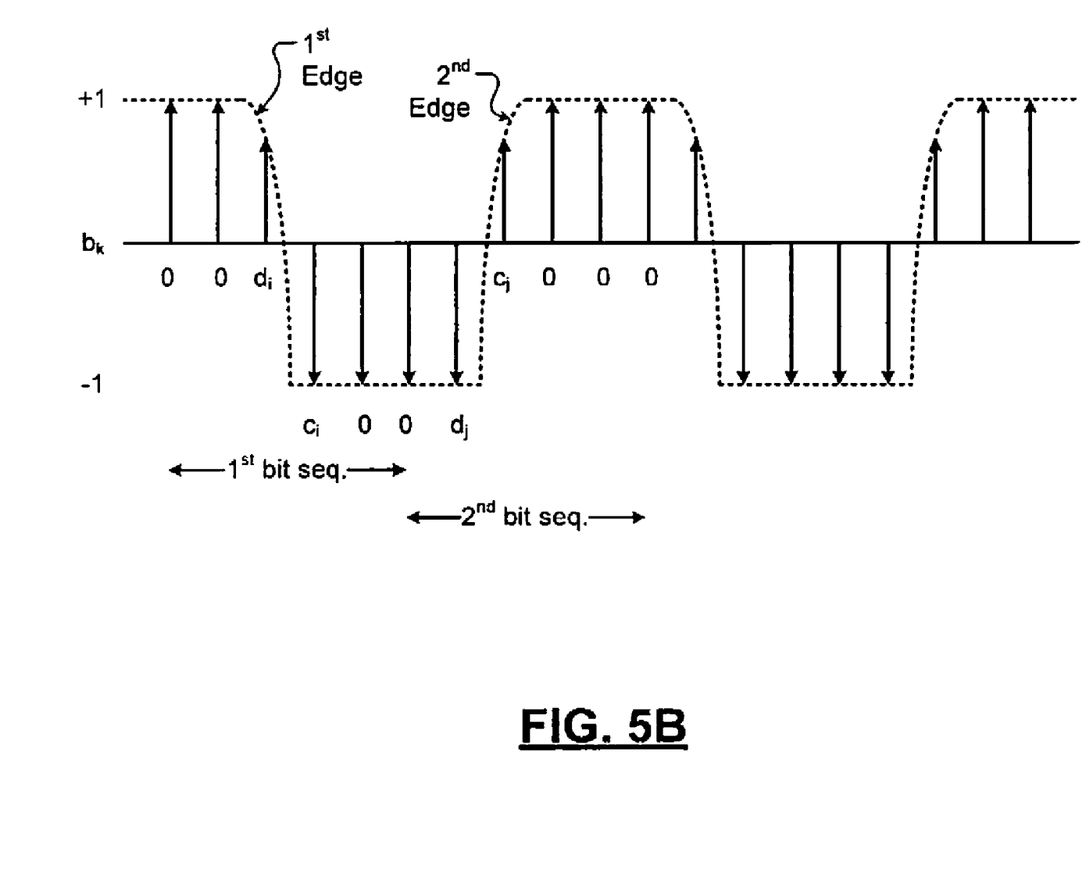
FIG. 5B depicts errors caused by data dependent length distortions of marks and spaces and examples of correction factors used to reduce the errors.

Referring now to FIGS. 5A and 5E, in some implementations, the correction factors may include two correction values per bit sequence. In FIG. 5A, a lookup table 508 includes correction factors, wherein each correction factor includes a pair of correction values ($C_i$, $D_i$). The correction values $C_i$ and $D_i$ may correct the input signal at sample points corresponding to bits immediately following and immediately preceding a transition in a bit sequence i, respectively. A correction factor may be selected from the lookup table 508 based on a combination of the type of transition, type of length distortion, and the bit sequence. The correction module 402 may determine the type of length distortion (positive or negative) and may measure the magnitude of the length distortion using modeling, for example.

The correction value $C_i$ may correct the input signal at a sample point corresponding to sample immediately following a transition in a bit sequence. The correction value $D_i$ may correct the input signal at a sample point corresponding to a sample immediately preceding the transition.

The samples that immediately follow and immediately precede the transition may be adjacent to each other. In other words, the correction values $C_i$ and $D_i$ may correct the input signal at first and second sample points, respectively. The first sample point of the input signal may correspond to a first sample in the bit sequence that immediately follows a transition. The second sample point of the input signal may correspond to a second sample in the bit sequence that immediately precedes the first sample.

In FIG. 5B, for example, when a first edge in a first bit sequence is detected, a correction value $C_i$ is output for the sample immediately following the first edge. Additionally, a correction value $D_i$ is output for the sample immediately preceding the first edge. Zeros are output for other samples in the bit sequence. Thus, the correction factor corresponding to the first bit sequence may be $00D_iC_i00$, and so on.

The values of $C_i$ and $D_i$ may depend on the sign of the length distortion (e.g., positive or negative) and the type of transition (e.g., whether the transition is a rising edge or a falling edge). For example only, for rising edges, the values of $C_i$ and $D_i$ may be as follows: $D_i>0$ and $C_i=0$ when the length distortion is positive, and $C_i<0$ and $D_i=0$ when the length distortion is negative. Additionally, the values of $C_i$ and $D_i$ may depend on the bit sequence. For example, the values of $C_i$ and $D_i$ may depend on bits preceding and following the transition (i.e., whether the edge is a M3S3 edge, an S2M3 edge, etc.).

The correction factors in the lookup table 508 are otherwise similar to the correction factors in the lookup table 408. For example, the number of entries in the lookup table 508 may be limited as explained in reference to the lookup table 408, etc. Additionally, the lookup table 508 may be otherwise similar to the lookup table 408. For example, the size of the lookup table 508 may depend on the size of bit sequences, etc.

Thus, for a bit sequence, the correction module 402 may output a correction value of zero for a current sample if the current sample and an immediately preceding sample in the bit sequence indicates no transition. The correction module 402 may output a correction value $C_i$ for the current sample if the current sample and the immediately preceding sample in the bit sequence indicates a transition. Additionally, the correction module 502 may output a correction value $D_i$ for the immediately preceding sample.

The correction factor (e.g., the correction factor $00D_iC_i00$) is then convolved with the target polynomial by the convolution module 410. Effectively, the input signal is corrected at a sample point corresponding to the position of the transition in the bit sequence. Subsequently, the decoder module 314 correctly decodes data from the bit sequence.

Figure 6:
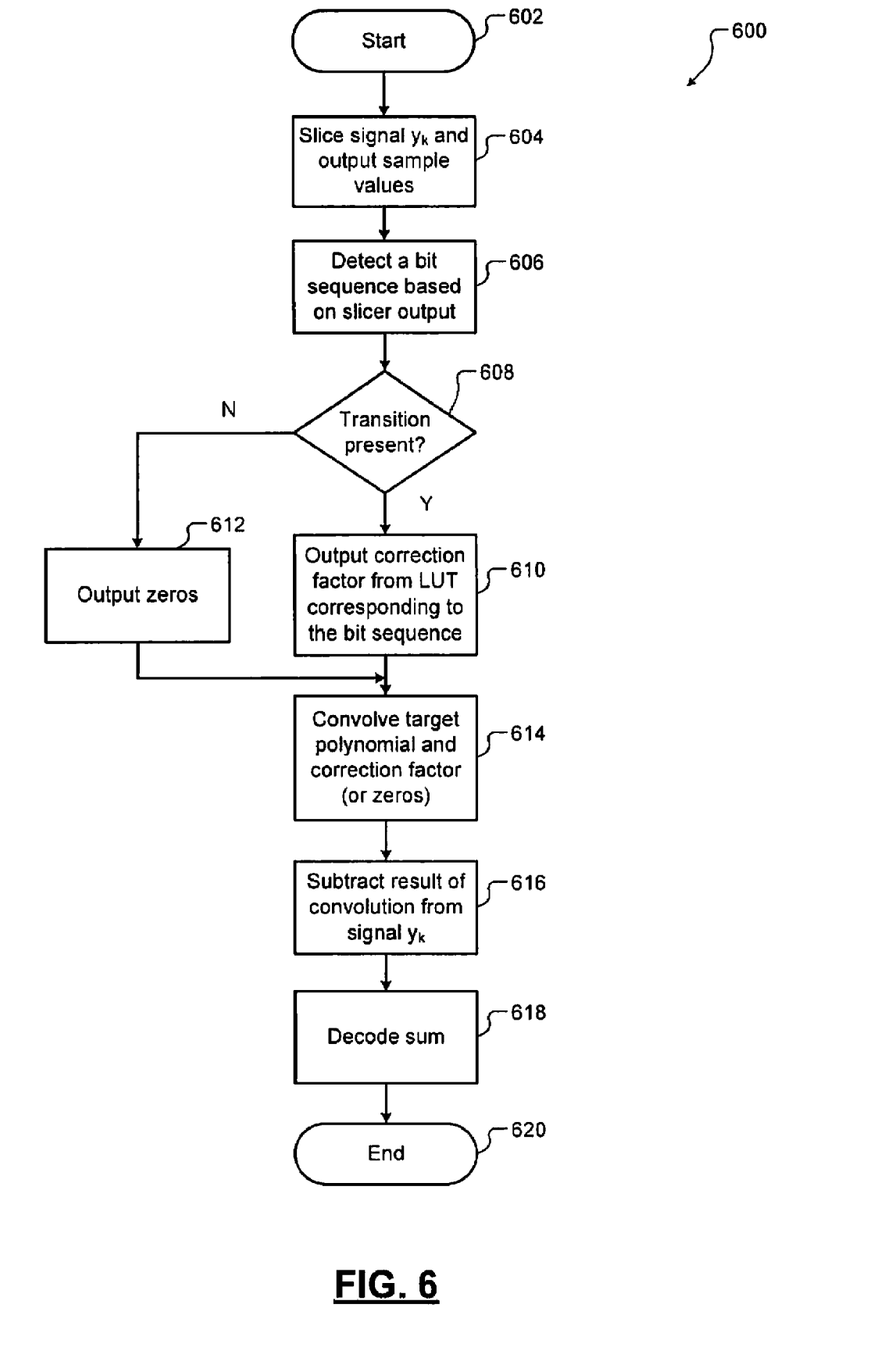
FIG. 6 is a flowchart of a method for correcting errors caused by data dependent length distortions of marks and spaces.

Referring now to FIG. 6, a method 600 for reducing distortion in the replay signal is shown. Control begins at 602. Control slices the signal $y_k$ and outputs samples at 604. Control detects a bit sequence based on the samples at 606. Control determines at 608 whether a transition is present in the bit sequence.

If the result of 608 is true, control outputs a correction factor corresponding to the bit sequence at 610. The correction factor includes a correction value for a sample following (or preceding) the transition. In some implementations, the correction factor includes first and second correction values for samples immediately following and preceding the transition, respectively. Additionally, the correction factor includes zeros for other samples in the bit sequence. The correction value depends on the type of transition (rising or falling edge) and the type of length distortion (+ve or −ve). If the result of 608 is false, control outputs zeros for the samples in the bit sequence at 612.

Control convolves the target polynomial and the correction factor (or zeros if no transition is present) at 614. Control subtracts the result of the convolution from the signal $y_k$ and outputs a sum at 616. Control decodes the sum and outputs decoded data at 618. Control ends at 620.

Throughout the present disclosure, the optical storage device is used as an example only. The teachings of the present disclosure may be implemented in other storage devices. For example, the teachings may be implemented in read channels of magnetic storage devices including hard disk drives (HDDs).

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system comprising:
  a sampling module configured to sample an input signal at sampling points and to output samples;
  a correction module configured to output a correction factor when
    a first one of the samples is preceded by a second one of the samples having a first polarity, and
    the first one of the samples is followed by a third one of the samples having a second polarity that is opposite of the first polarity,
    wherein the correction factor comprises a correction value that is based on at least one of the samples that precedes the first one of the samples, and
    wherein the correction value is used to correct the input signal at a first one of the sampling points corresponding to the first one of the samples;
  a convolution module configured to convolve the correction factor with a target polynomial selected based on a sequence detector of the system and to generate a convolved output; and
  a summing module configured to generate an output signal by summing the convolved output and the input signal.

2. The system of claim 1, wherein the correction value is based on at least one of the samples that follows the first one of the samples.

3. The system of claim 1, wherein when the correction factor includes a plurality of correction values, one of the plurality of the correction values that is different than the correction value is used to correct the input signal at a second one of the sampling points corresponding to one of the second one of the samples and the third one of the samples.

4. The system of claim 1, wherein the correction factor is based on the first and second polarities.

5. The system of claim 1, wherein the sequence detector includes a Viterbi detector.

6. The system of claim 1 further comprising a delay module configured to delay the input signal to synchronize timing of the input signal and the convolved output.

7. The system of claim 1, wherein the correction module comprises a sequence detection module configured to detect a sequence of the samples based on a clock, wherein a period of the clock is based on a duration of a bit of data in the input signal.

8. A read channel module of one of an optical storage device and a magnetic storage device comprising the system of claim 1.

9. A system of comprising:
  a sampling module configured to sample an input signal at sampling points and to output samples; and a correction module configured to output a correction factor when
  a first one of the samples is preceded by a second one of the samples having a first polarity, and
  the first one of the samples is followed by a third one of the samples having a second polarity that is opposite of the first polarity,
wherein the correction factor comprises a correction value that is based on at least one of the samples that precedes the first one of the samples,
wherein the correction value is used to correct the input signal at a first one of the sampling points corresponding to the first one of the samples, and
wherein when the correction factor includes a plurality of correction values, a number of the plurality of correction values is based on a target polynomial of a sequence detector used to detect a sequence of bits in the input signal.

10. A system of comprising:
a sampling module configured to sample an input signal at sampling points and to output samples;
a correction module configured to output a correction factor when
  a first one of the samples is preceded by a second one of the samples having a first polarity, and
  the first one of the samples is followed by a third one of the samples having a second polarity that is opposite of the first polarity,
wherein the correction factor comprises a correction value that is based on at least one of the samples that precedes the first one of the samples,
wherein the correction value is used to correct the input signal at a first one of the sampling points corresponding to the first one of the samples, and
wherein the correction module comprises:
  a lookup module configured to include a lookup table comprising a plurality of correction factors for sequences of the samples and to look up the correction factor corresponding to a sequence of the samples from the lookup table;
  a convolution module configured to convolve the correction factor and a target polynomial selected based on a sequence detector of the system and to generate a convolved output; and
  a summing module configured to generate an output signal by summing the convolved output and the input signal.

11. A method of comprising:
receiving an input signal from a storage medium of a data storage device;
sampling the input signal at sampling points and outputting samples;
outputting a correction factor comprising a correction value;
correcting the input signal at a first one of the sampling points corresponding to a first one of the samples using the correction value when
  the first one of the samples is preceded by a second one of the samples having a first polarity, and
  the first one of the samples is followed by a third one of the samples having a second polarity that is opposite of the first polarity,
  wherein the correction value is based on at least one of the samples that precedes the first one of the samples;
convolving the correction factor with a target polynomial selected based on a sequence detector of the data storage device and generating a convolved output; and
generating an output signal by summing the convolved output and the input signal.

12. The method of claim 11, wherein the correction value is based on at least one of the samples that follows the first one of the samples.

13. The method of claim 11, wherein when the correction factor includes a plurality of correction values, one of the plurality of the correction values that is different than the correction value is used to correct the input signal at a second one of the sampling points corresponding to one of the second one of the samples and the third one of the samples.

14. The method of claim 11, wherein the correction factor is based on the first and second polarities.

15. The method of claim 11 further comprising delaying the input signal to synchronize timing of the input signal and the convolved output.

16. A method comprising:
receiving an input signal from a storage medium of a data storage device;
sampling the input signal at sampling points and outputting samples;
outputting a correction factor comprising a correction value; and
correcting the input signal at a first one of the sampling points corresponding to a first one of the samples using the correction value when
  the first one of the samples is preceded by a second one of the samples having a first polarity, and
  the first one of the samples is followed by a third one of the samples having a second polarity that is opposite of the first polarity,
wherein the correction value is based on at least one of the samples that precedes the first one of the samples, and
wherein when the correction factor includes a plurality of correct values, a number of the plurality of correction values is based on a target polynomial of a sequence detector used to detect a sequence of bits in the input signal.

17. A method comprising:
receiving an input signal from a storage medium of a data storage device;
sampling the input signal at sampling points and outputting samples;
outputting a correction factor comprising a correction value;
correcting the input signal at a first one of the sampling points corresponding to a first one of the samples using the correction value when
  the first one of the samples is preceded by a second one of the samples having a first polarity, and
  the first one of the samples is followed by a third one of the samples having a second polarity that is opposite of the first polarity,
  wherein the correction value is based on at least one of the samples that precedes the first one of the samples;
outputting the correction factor corresponding to a sequence of the samples from a lookup table comprising a plurality of correction factors for sequences of the samples;
convolving the correction factor with a target polynomial selected based on a sequence detector of the data storage device and generating a convolved output; and
generating an output signal by summing the convolved output and the input signal.

* * * * *